United States Patent [19]

Gu

[11] Patent Number: 4,668,106

[45] Date of Patent: May 26, 1987

[54] THRUST BEARING UNDERSPRING

[75] Inventor: Alston L. Gu, Rancho Palos Verdes, Calif.

[73] Assignee: The Garrett Corporation, Los Angeles, Calif.

[21] Appl. No.: 851,077

[22] Filed: Apr. 11, 1986

Related U.S. Application Data

[63] Continuation of Ser. No. 672,982, Nov. 19, 1984, abandoned.

[51] Int. Cl.⁴ ............................................. F16C 17/08
[52] U.S. Cl. ................................. 384/105; 384/106; 267/161; 267/181
[58] Field of Search ............... 384/105, 106; 267/160, 267/161, 181

[56] References Cited

U.S. PATENT DOCUMENTS

| | | | |
|---|---|---|---|
| 2,100,464 | 11/1937 | Almen et al. ........................ | 267/161 |
| 3,114,388 | 12/1963 | Hoen .................................... | 267/161 |
| 3,483,888 | 12/1969 | Wurzel ................................ | 267/161 |
| 3,635,539 | 1/1972 | Barnett . | |
| 3,893,733 | 7/1975 | Silver et al. . | |
| 4,153,315 | 5/1979 | Silver et al. . | |
| 4,227,753 | 10/1980 | Wilcock ............................. | 384/105 |
| 4,462,700 | 7/1984 | Agrawal ............................. | 384/105 |
| 4,496,137 | 1/1985 | Reik .................................... | 267/181 |

Primary Examiner—Lenard A. Footland
Attorney, Agent, or Firm—Albert J. Miller

[57] ABSTRACT

A foil thrust bearing having an underspring with alternating upper ridges and lower ridges.

40 Claims, 6 Drawing Figures

THRUST BEARING UNDERSPRING

This is a continuation of application Ser. No. 672,982 filed Nov. 19, 1984, now abandoned.

BACKGROUND OF THE INVENTION

Process fluid or gas bearings are now being utilized in an increasing number of diverse applications. These fluid bearings generally comprise two relatively movable elements with a predetermined spacing therebetween filled with a fluid such as air, which, under dynamic conditions, form a supporting wedge sufficient to prevent contact between the two relatively movable elements.

More recently, improved fluid bearings, particularly gas bearings of the hydrodynamic type, have been developed by providing foils in the space between the relatively movable bearing elements. Such foils, which are generally thin sheets of a compliant material, are deflected by the hydrodynamic film forces between adjacent bearing surfaces and the foils thus enhance the hydrodynamic characteristics of the fluid bearings and also provide improved operation under extreme load conditions when normal bearing failure might otherwise occur. Additionally, these foils provide the added advantage of accommodating eccentricity of the relatively movable elements and further provide a cushioning and dampening effect.

The ready availability of relatively clean process fluid or ambient atmosphere as the bearing fluid makes these hydrodynamic, fluid film lubricated, bearings particularly attractive for high speed rotating machinery. While in many cases the hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capability. While these externally pressurized or hydrostatic fluid bearings do increase the load carrying capacity, they do introduce the requirement for an external source of clean fluid under pressure.

In order to properly position the compliant foils between the relatively movable bearing elements a number of mounting means have been devised. In thrust bearings, it is conventional practice to mount a plurality of individually spaced foils on a foil bearing disk such as by spot welds and position the foil bearing disk on one of the bearing elements as exemplified in U.S. Pat. No. 3,635,534.

To establish stability of the foils in most of these mounting means, a substantial pre-load is required on the foil. That is, the individual foils must be loaded against the relatively movable bearing element opposed to the bearing element upon which the foils are mounted. It has been conventional to provide separate compliant stiffener elements or undersprings beneath the foils to supply this required preload as exemplified in U.S. Pat. Nos. 3,893,733 and 4,153,315. Under extremely high load, however, the compliance of these underfoils may be exceeded and the underspring "bottom out", thus destroying the load carrying capability of the bearing.

SUMMARY OF THE INVENTION

In the present invention, the foil thrust bearing is provided with a thrust bearing underspring having alternating upper ridges and lower ridges, with the upper ridges having a height greater than the lower ridges.

DESCRIPTION OF THE PREFERRED EMBODIMENTS

Figure 1:
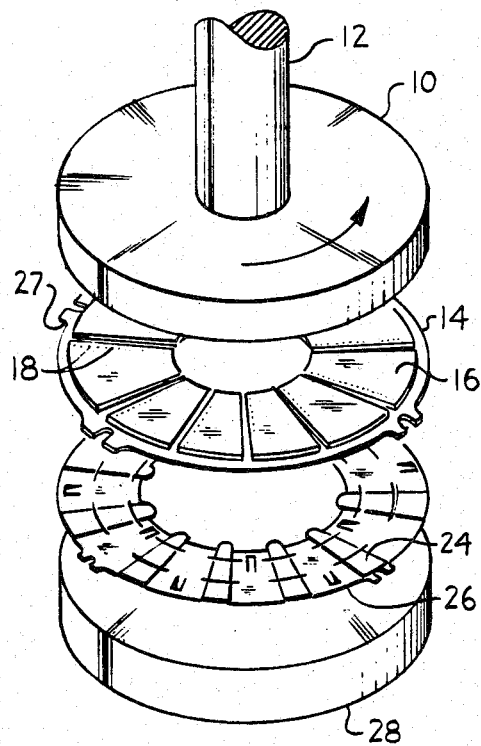
FIG. 1 is an exploded perspective view of a foil thrust bearing of the present invention.

As illustrated in FIG. 1, the thrust runner 10 including shaft 12 is rotatably supported on the thrust plate 28 by means of the thrust bearing disk 14 and thrust bearing stiffener or underspring 22. The thrust bearing disk 14 includes a plurality of bearing pads or foils 16 while the thrust bearing underspring 22 includes a plurality of upper ridges 24 and lower ridges 26 alternately disposed thereon to provide stiffness for the thrust bearing disk 14.

Figure 2:
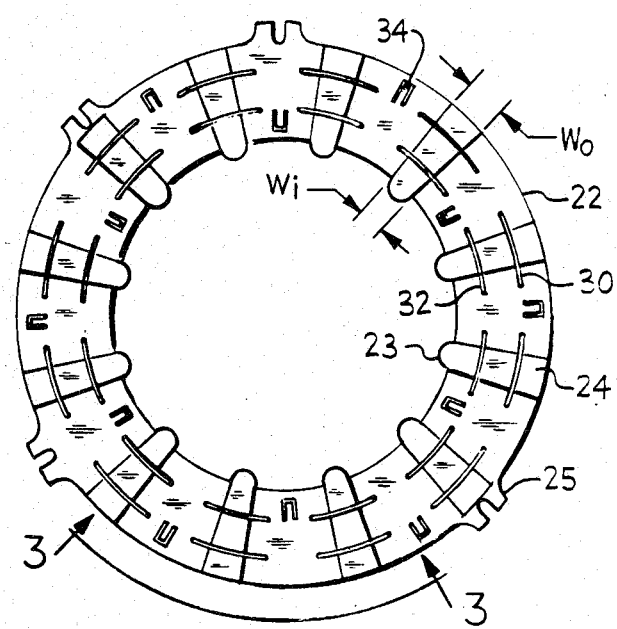
FIG. 2 is an enlarged top plan view of the thrust bearing underspring of the foil thrust bearing of FIG. 1.
Figure 3:
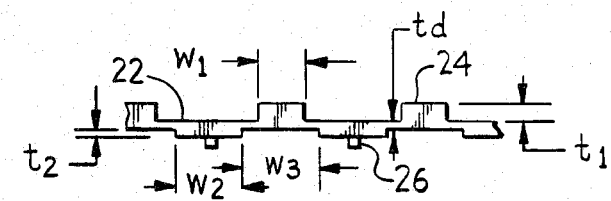
FIG. 3 is a cross-sectional view of the thrust bearing underspring of FIG. 2 taken along line 3—3 thereof.
Figure 4:
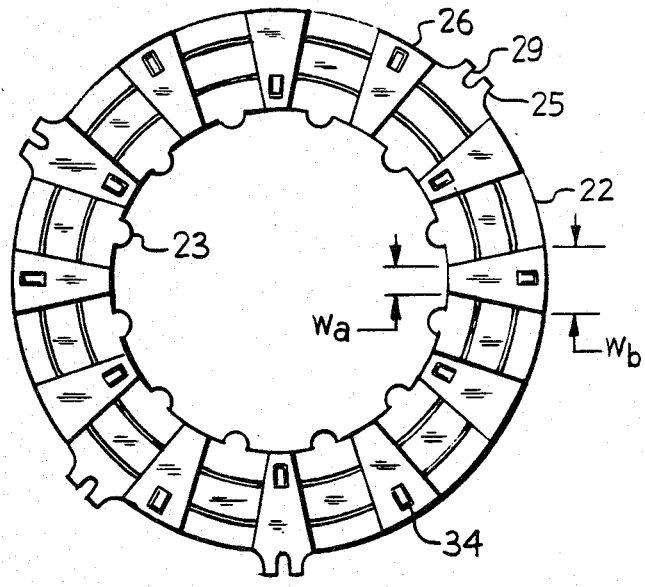
FIG. 4 is an enlarged bottom plan view of the thrust bearing underspring of FIG. 2.

As more fully shown in FIGS. 2–4, the thrust bearing underspring 22 generally comprises a thin compliant ring disk ranging in thickness $t_d$ between 0.001 inches and 0.020 inches and can be produced by conventional chemical etching techniques. The upper ridges 24 of this thrust bearing underspring 22 have a height defined as $t_1$. The upper ridges 24 radially outwardly diverge in width as best illustrated in FIG. 2. The width of these upper ridges 24 is generally defined by $w_1$ with the width at the outer diameter defined as $w_o$ and the width at the inner diameter defined as $w_i$. The outer diameter width $w_o$ is generally from 0 to 30% greater than the inner diameter width $w_i$. In the underspring 22 illustrated in FIG. 2, the upper ridges 24 are formed by radially eminating lines.

Certain of the upper ridges 24 may include outer projections 25 having cutouts 29 which can be utilized to maintain the position of the underspring 22 with respect to the thrust plate 28. Similar projections 27 may be spaced around the thrust bearing disk 14. The upper ridges 24 may also include inner projections 23 which extend radially inward from the inner diameter of the underspring 22.

The lower ridges 26 include tabs 34 extending toward the thrust plate 28. These tabs 34 may be provided near the outer diamater of the lower ridges 26, near the inner diameter of the lower ridges 26, or alternating between these two positions as shown in FIG. 2. The tabs 34 provide the initial pre-load for the bearing assembly to maintain static contact between the thrust plate 28, stiffener 22, thrust disk 24, and thrust runner 10. These relatively soft tabs 34 readily deform under hydrodynamic pressure such that the lower ridges 26 will contact the thrust plate 28 as illustrated most clearly in FIG. 6.

The height of the lower ridges 26 is defined as $t_2$ with their width generally defined as $w_2$. The lower ridges 26 also outwardly diverge radially with the width at the inner diameter defined as $w_a$ and the width at the outer diameter defined as $w_b$. As is best illustrated in FIG. 4, the radial outward divergence of the lower ridges 26 is considerably greater than the radial outward divergence of the upper ridges 24. The spacing between the upper ridges 24 and the lower ridges 26 radially outwardly converges as shown in FIG. 4.

The dimension for the height $t_1$ of the upper ridges 24 will always be greater than the dimension for the height $t_2$ of the lower ridges 26. While the relationship between $t_1$ and $t_2$ may vary considerably depending upon different operating conditions, $t_1$ will generally be greater than $t_2$ by between 0.001 to 0.010 inches in order to accomodate deflection of the thrust disk due to hydrodynamic pressure.

The resiliency or spring rate of the underspring 22 can be varied by changing its thickness or the dimensions of the upper and lower ridges 24, 26. The space between adjacent lower ridges 26, defined as $w_3$, has a marked effect on the stiffness and will generally outwardly converge at least slightly in order to better accommodate the hydrodynamic pressure forces which increase radially. Additionally, slots 30, 32 can be provided transversely across the upper ridges 24 to divide the upper ridges into three separate sections. With the radially diverging upper ridges 24 divided into three separate sections, the stiffness of the upper ridges will more closely conform to the radially increasing hydrodynamic pressure forces.

Figure 5:
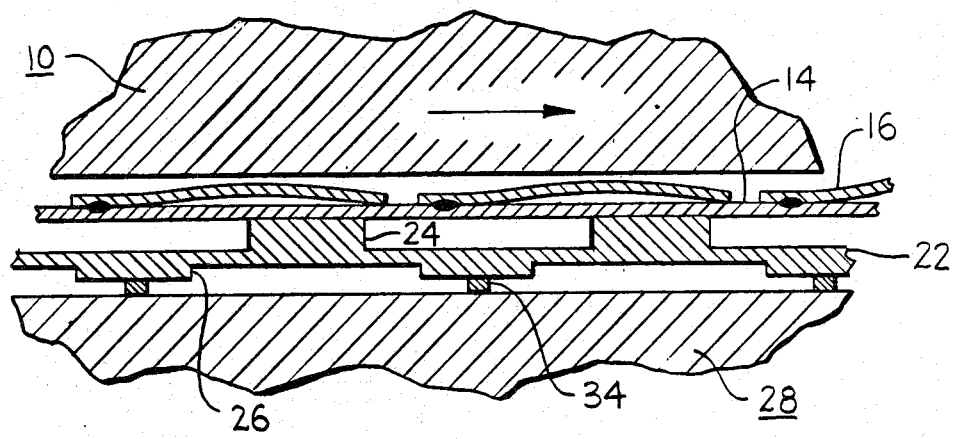
FIG. 5 is an enlarged sectional view of the foil thrust bearing of FIG. 1 in a static condition.
Figure 6:
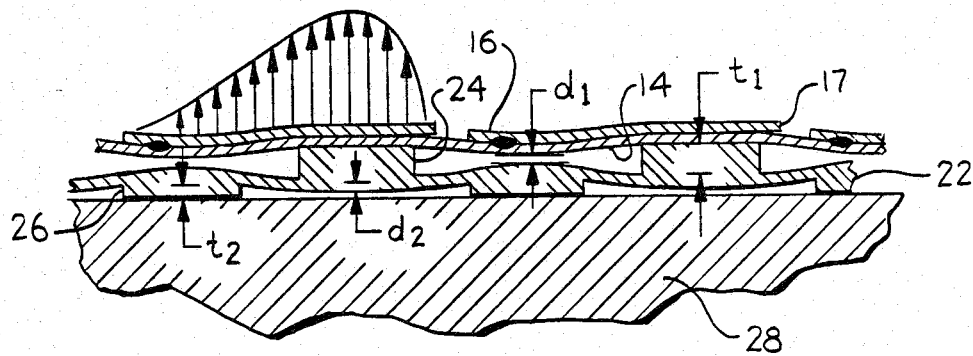
FIG. 6 is an enlarged sectional view of the foil thrust bearing of FIG. 1 in a dynamic condition.

The foil thrust bearing of the present invention is shown further enlarged in FIG. 5 (static condition) and FIG. 6 (dynamic condition). For purposes of better illustrating the invention, the size of the underspring 22 has been enlarged considerably, more particularly in the axial direction, than the thrust bearing disk 14. It is important, however, to stress the relative position of the disk 14 and its foils 16 with respect to the upper and lower ridges 24, 26 of the underspring 22 and in particular the interaction therebetween in the dynamic condition of FIG. 6.

In the static or nonoperating condition of FIG. 5, the foils 16 of the thrust bearing disk 14 are shown as having the upper ridges 24 of the underspring 22 generally under the trailing edge half thereof. In this static condition, neither the disk 14 nor underspring 22 will be deflected and both will be substantially transverse to the eventual axis of rotation. The arrow provided on the thrust runner 10 indicates the direction of rotational movement that the runner will take with respect to the foils 16 on the disk 14. In order to assist the establishment of the hydrodynamic film between the foils 16 and the thrust runner 10, the foils 16 may be curved as shown in FIG. 5 or the leading edge of the foils may be tapered to a thinner thickness than the rest of the foil.

Once relative rotational movement is established between the thrust runner 10 and thrust plate 28, a hydrodynamic fluid film is developed between the thrust disk foils 16 and the thrust runner 10 and the dynamic condition illustrated in FIG. 6 will occur. The fluid film pressure gradient established above an individual foil 16 is generally shown by the varying length of arrows provided above the leftmost foil of FIG. 6. This pressure is least at the the leading edge of the foil and gradually increases during the converging or wedge portion of the foil before the position of the upper ridge 24 of the underspring 22 therebeneath. The maximum pressure occurs in that portion of the foil directly over the upper ridge 24 and then markedly declines to zero near the trailing edge of the foil.

While the dynamic operation of the foil thrust bearing will deform the thrust bearing disk and foils as generally shown in FIG. 6, the pressure developed therein will also deflect the underspring as likewise illustrated in FIG. 6. The position of the underspring above the lower ridges 26 will not change but the distance between the underspring 22 above the lower ridges 26 and the underspring side of the disk 14, defined as $d_1$, will generally be 0.001 inches to 0.005 inches less than $t_1$ while still providing suitable operation of the thrust bearing.

In addition, under dynamic conditions, the underspring 22 beneath the upper ridges 24 will be deflected towards the thrust plate 28 a distance defined as $d_2$, such that the spacing between the disk 22 and the thrust plate 28 in this region will be less than the height of the lower ridges $t_2$. This spacing, $t_2-d_2$ depends on the bearing stiffness and hydrodynamic film pressure.

With $t_1$ at least 0.005 inches greater than $t_2$, even if $d_2$ approaches or actually equals $t_2$ (bottoms out), the upper ridges 24 will still provide support for the thrust disk 14 so that the hydrodynamic forces will conform the foils to the shape generally shown in FIG. 6. If $t_1$ were to be equal to $t_2$ and $d_2$ equal to $t_1$, then the top of the upper ridges 24 would then be no higher than the upper surface of the underspring 22 and the foils 16 would no longer be deflected to form the pressure forming surface as shown.

While specific embodiments of the invention have been illustrated and described, it is understood that these are provided by way of example only. While the invention is shown as a thrust bearing, it should be readily apparent that it is equally applicable to a conical bearing which has a thrust component. The invention is to be construed as being limited only by the proper scope of the following claims.

We claim:

1. A fluid thrust bearing comprising:
   a thrust runner;
   a thrust plate to rotatably support the thrust runner; and
   a compliant foil bearing operably disposed between said thrust runner and said thrust plate and mounted on said thrust plate, said compliant foil bearing including a thrust disk having a plurality of converging surface compliant foils disposed towards said thrust runner, and a foil stiffener disk having a plurality of upper and lower ridges alternately transversely disposed therearound between the thrust disk and the thrust plate, the upper ridges having a height generally between 0.001 and 0.010 inches greater than the height of the lower ridges.

2. The fluid thrust bearing of claim 1 wherein said converging surface compliant foils are individually mounted upon said thrust disk.

3. The fluid thrust bearing of claim 1 wherein said converging surface compliant foils are integral with said thrust disk.

4. The fluid thrust bearing of claim 1 wherein the space between adjacent lower ridges radially converges.

5. The fluid thrust bearing of claim 1 wherein the upper ridges outwardly diverge radially.

6. The fluid thrust bearing of claim 5 wherein the sides of the radially outwardly diverging upper ridges are radial lines.

7. The fluid thrust bearing of claim 1 wherein the lower ridges outwardly diverge radially.

8. The fluid thrust bearing of claim 1 wherein the upper ridges have at least one transverse slot dividing the upper ridges into at least two segments.

9. The fluid thrust bearing of claim 8 wherein the upper ridges have two transverse slots dividing the upper ridges into three segments.

10. The fluid thrust bearing of claim 1 wherein the lower ridges include outwardly extending tabs.

11. The fluid thrust bearing of claim 10 wherein the outwardly extending tabs are located near the outer diameter of the lower ridges.

12. The fluid thrust bearing of claim 10 wherein the outwardly extending tabs are located near the inner diameter of the lower ridges.

13. The fluid thrust bearing of claim 10 wherein the outwardly extending tabs are alternately located near the inner diameter and the outer diameter of adjacent lower ridges.

14. The fluid thrust bearing of claim 1 wherein the upper ridges project inward beyond the inner diameter of the thrust disk.

15. The fluid thrust bearing of claim 1 wherein the upper ridges outwardly diverge radially, the lower ridges outwardly diverge radially, and the space between adjacent lower ridges outwardly converges radially.

16. An underspring for a foil thrust bearing comprising:
a compliant ring disk;
a plurality of upper ridges disposed on one surface of the disk; and
a plurality of lower ridges disposed on the other surface of the disk generally between adjacent upper ridges,
the upper ridges having a height generally between 0.001 inches and 0.010 inches greater than the height of the lower ridges and at least one transverse slot dividing the upper ridges into at least two segments.

17. The underspring of claim 16 wherein the upper ridges have two transverse slots dividing the upper ridges into three segments.

18. An underspring for a foil thrust bearing comprising:
a compliant ring disk;
a plurality of upper ridges disposed on one surface of the disk; and
a plurality of lower ridges disposed on the other surface of the disk generally between adjacent upper ridges,
the upper ridges having a height generally between 0.001 inches and 0.010 inches greater than the height of the lower ridges and the lower ridges including outwardly extending tabs.

19. The underspring of claim 18 wherein the outwardly extending tabs are located near the outer diameter of the lower ridges.

20. The underspring of claim 18 wherein the outwardly extending tabs are located near the inner diameter of the lower ridges.

21. The underspring of claim 18 wherein the outwardly extending tabs are alternately located near the inner diameter and the outer diameter of adjacent lower ridges.

22. A fluid thrust bearing comprising:
a pair of members arranged for relative rotation with respect to one another, one of said pair of members adapted to rotatably support the other; and
a compliant foil bearing operably disposed between said pair of relatively rotatable members and mounted to one of said pair of relatively rotatable members, said compliant foil bearing including a thrust disk having a plurality of compliant foils and an underspring, the underspring comprising a flat disk having a plurality of upper ridges and lower ridges alternately disposed thereon, the upper ridges having a height from the flat disk greater than the height of the lower ridges from the flat disk.

23. The fluid thrust bearing of claim 22 wherein the height of the upper ridges is at least 0.001 inches greater than the height of the lower ridges.

24. A fluid thrust bearing comprising:
a pair of members arranged for relative rotation with respect to one another, one of said pair of members adapted to rotatably support the other; and
a compliant foil bearing operably disposed between said pair of relatively rotatable members and mounted to one of said pair of relatively rotatable members, said compliant foil bearing including a thrust disk having a plurality of compliant foils and an underspring, the underspring comprising a generally flat disk having a plurality of upper ridges and lower ridges alternately disposed thereon, the upper ridges having a height from the flat disk greater than the height of the lower ridges from the flat disk and the sides of the upper ridges and lower ridges are generally perpendicular to the generally flat disk.

25. The fluid thrust bearing of claim 24 wherein the upper ridges have a height from the flat disk at least 0.001 inches greater than the height of the lower ridges from the flat disk.

26. A fluid thrust bearing comprising:
a pair of members arranged for relative rotation with respect to one another, one of said pair of members adapted to rotatably support the other; and
a compliant foil bearing operably disposed between said pair of relatively rotatable members and mounted to one of said pair of relatively rotatable members, said compliant foil bearing including a thrust disk having a plurality of compliant foils and an underspring, the underspring comprising a generally flat disk having a plurality of upper ridges and lower ridges alternately disposed thereon, the upper ridges having a height from the flat disk greater than the height of the lower ridges from the flat disk and the upper ridge having at least one transverse slot dividing the upper ridges into at least two segments.

27. The fluid thrust bearing of claim 26 wherein the upper ridges have two transverse slots dividing the upper ridges into three segments.

28. A fluid thrust bearing comprising:
a pair of members arranged for relative rotation with respect to one another, one of said pair of members adapted to rotatably support the other; and
a compliant foil bearing operably disposed between said pair of relatively rotatable members and mounted to one of said pair of relatively rotatable members, said compliant foil bearing including a thrust disk having a plurality of compliant foils and an underspring, the underspring comprising a generally flat disk having a plurality of upper ridges and lower ridges alternately disposed thereon, the upper ridges having a height from the flat disk greater than the height of the lower ridges from the flat disk and the lower ridges including outwardly extending tabs.

29. The fluid thrust bearing of claim 28 wherein the outwardly extending tabs are located near the outer diameter of the lower ridges.

30. The fluid thrust bearing of claim 28 wherein the outwardly extending tabs are located near the inner diameter of the lower ridges.

31. The fluid thrust bearing of claim 28 wherein the outwardly extending tabs are alternately located near the inner diameter and the outer diameter of adjacent lower ridges.

32. A fluid thrust bearing comprising:
a thrust runner;
a thrust plate to rotatably support the thrust runner; and
a compliant foil bearing operably disposed between said thrust runner and said thrust plate and mounted on said thrust plate, said compliant foil bearing including a thrust disk having a plurality of converging surface compliant foils disposed towards said thrust runner, and a foil stiffener flat disks having a plurality of upper and lower ridges alternately transversely disposed therearound between the thrust disk and the thrust plate, the upper ridges having a height greater than the height of the lower ridges.

33. The fluid thrust bearing of claim 32 wherein said converging surface compliant foils are individually mounted upon said thrust disk.

34. The fluid thrust bearing of claim 32 wherein said converging surface compliant foils are integral with said thrust disk.

35. A foil thrust bearing underspring comprising:
a compliant flat ring disk;
a plurality of upper ridges disposed on one surface of the flat disk; and
a plurality of lower ridges disposed on the other surface of the flat disk generally between adjacent upper ridges;
the upper ridges having a height from the flat disk greater than the height of the lower ridges from the flat disk and the sides of the upper ridges and lower ridges are generally perpendicular to the flat disk.

36. The underspring of claim 35 wherein the height of the upper ridges from the flat disk is at least 0.001 inches greater than the height of the upper ridges from the flat disk.

37. The underspring of claim 35 wherein the upper ridges have at least one transverse slot dividing the upper ridges into at least two segments.

38. The underspring of claim 35 wherein the lower ridges include outwardly extending tabs.

39. A fluid thrust bearing comprising:
a thrust runner;
a thrust plate to rotatably support the thrust runner; and
a compliant foil bearing operably disposed between said thrust runner and said thrust plate and mounted on said thrust plate, said compliant foil bearing including a thrust disk having a plurality of converging surface compliant foils disposed towards said thrust runner and a foil stiffener, the foil stiffener having a plurality of upper and lower ridges alternately transversely disposed therearound between the thrust disk and the thrust plate, the upper ridges having a height from the flat disk greater than the height of the lower ridges from the flat disk and the sides of the upper ridges and lower ridges are generally perpendicular to the flat disk.

40. The fluid thrust bearing of claim 39 wherein the height of the upper ridges from the flat disk is at least 0.001 inches greater than the height of the upper ridges from the flat disk.

* * * * *